US012352952B2

(12) United States Patent
Takashima et al.

(10) Patent No.: US 12,352,952 B2
(45) Date of Patent: Jul. 8, 2025

(54) SPACE, TIME AND ANGULAR MULTIPLEXED DYNAMIC IMAGE TRANSFER FOR AUGMENTED REALITY DISPLAY

(71) Applicant: Arizona Board of Regents on Behalf of the University of Arizona, Tucson, AZ (US)

(72) Inventors: Yuzuru Takashima, Tucson, AZ (US); Brandon Hellman, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 483 days.

(21) Appl. No.: 17/633,767

(22) PCT Filed: Aug. 10, 2020

(86) PCT No.: PCT/US2020/045579
§ 371 (c)(1),
(2) Date: Feb. 8, 2022

(87) PCT Pub. No.: WO2021/026526
PCT Pub. Date: Feb. 11, 2021

(65) Prior Publication Data
US 2022/0276484 A1  Sep. 1, 2022

Related U.S. Application Data

(60) Provisional application No. 62/884,546, filed on Aug. 8, 2019.

(51) Int. Cl.
G02B 26/08 (2006.01)
G06T 19/00 (2011.01)
H04N 5/74 (2006.01)

(52) U.S. Cl.
CPC ........ *G02B 26/0833* (2013.01); *G06T 19/006* (2013.01); *H04N 5/7458* (2013.01)

(58) Field of Classification Search
CPC ................ G02B 26/0833; G02B 30/40; G02B 2027/0127; G02B 2027/0185;
(Continued)

(56) References Cited

U.S. PATENT DOCUMENTS 6,761,459 B1  7/2004 Arsenich
2010/0046092 A1  2/2010 Konstantinovich et al.
(Continued)

OTHER PUBLICATIONS

Hellman et al. "Angular and spatial light modulation by single digital micromirror device for multi-image output and hearly-doubled etendue" Optics Express, vol. 27, No. 15, Jul. 22, 2019, pp. 21477-21496. Retrieved from the Internet <URL: https://www.osapublishing.org/oe/abstract.cfm?uri=02 27-15-21477> entire document.
(Continued)

*Primary Examiner* — Magda Cruz
(74) *Attorney, Agent, or Firm* — Bond, Shoeneck & King, PLLC; George R. McGuire

(57) ABSTRACT

A design and implementation of a new optical architecture: space, time, and angular division multiplexed image transfer by Digital Micromirror Device. The method, like various multiplexing methods employed in communication engineering, enables image transfer via an angular band-limited data channel such as an optical image guide by dynamically redistributing a signal into multiple domains such as space, time, angle, wavelength, and polarization.

17 Claims, 19 Drawing Sheets

(58) Field of Classification Search
CPC ........ G02B 27/0172; G02B 2027/0112; G02B 27/0081; G02B 2027/0125; G06T 19/006; H04N 5/7458
USPC .......................................................... 353/37
See application file for complete search history.

(56) References Cited

U.S. PATENT DOCUMENTS

| | | | |
|---|---|---|---|
| 2013/0301114 A1 | 11/2013 | Sangawa et al. | |
| 2014/0104665 A1* | 4/2014 | Popovich ............. | G02B 6/0076 359/15 |
| 2014/0140653 A1* | 5/2014 | Brown ................. | G02B 6/0033 385/10 |
| 2015/0286056 A1 | 10/2015 | Takashima | |
| 2016/0291328 A1* | 10/2016 | Popovich ........... | G02B 27/0176 |
| 2016/0327789 A1* | 11/2016 | Klug ................... | G02B 27/0101 |
| 2017/0307886 A1* | 10/2017 | Stenberg .............. | G02B 5/1814 |
| 2018/0188542 A1* | 7/2018 | Waldern ............. | G02B 27/0093 |
| 2019/0121027 A1* | 4/2019 | Popovich ............. | G02B 27/283 |

OTHER PUBLICATIONS

Nakamura, et al. "Design of discretely depth-varying holographic grating for image guide based see-through and near-to-eye displays" Optics Express, vol. 26, No. 20, Oct. 1, 2018, pp. 26520-26533. Retrieved from the Internet <URL: https://www.osapublishing.org/oe/abstract.cfm?uri=oe-26-20-26520> entire document.

International Search Report and Written Opinion of PCT/US20/45579, mailing date of search report Oct. 26, 2020.

* cited by examiner

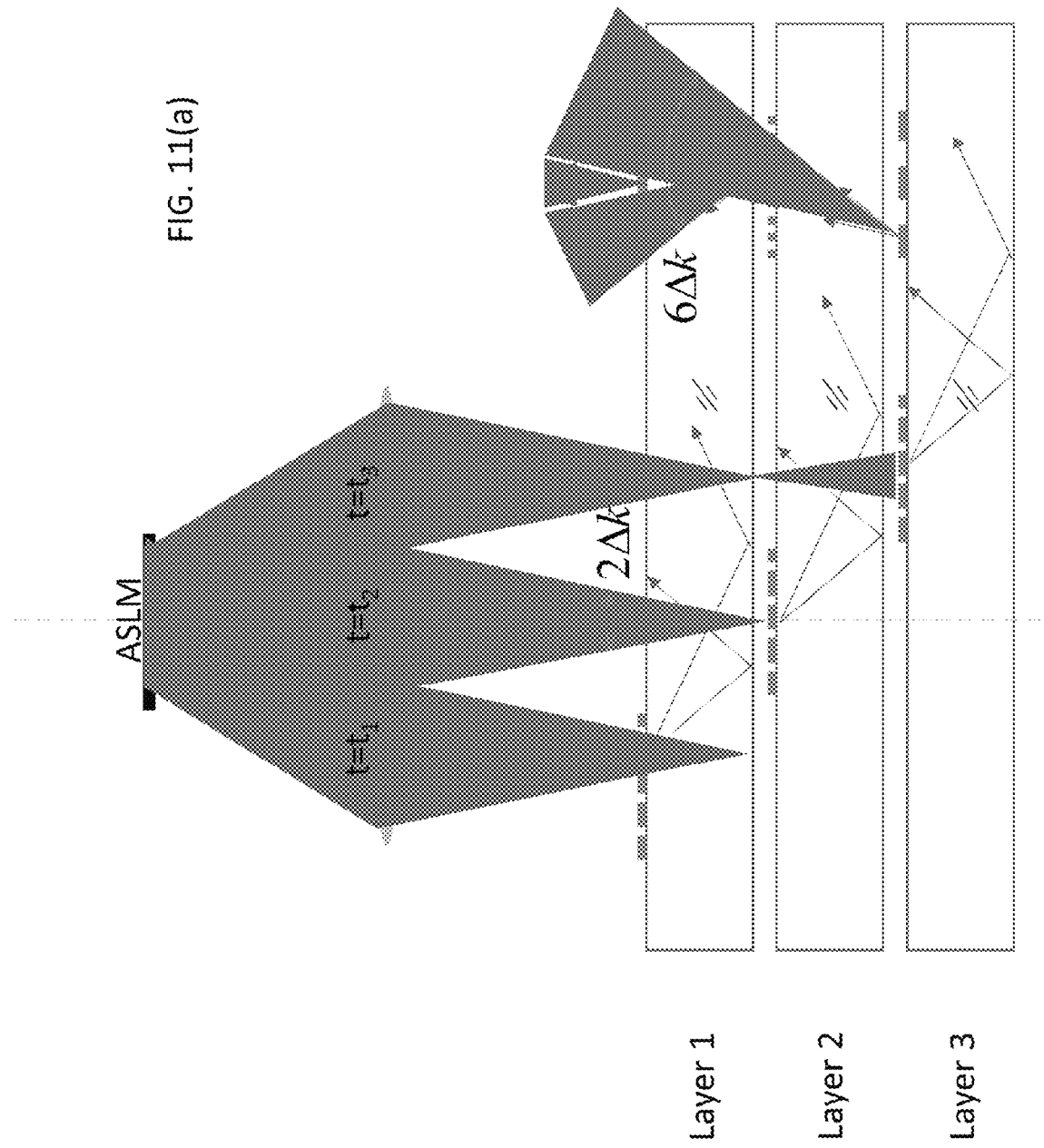

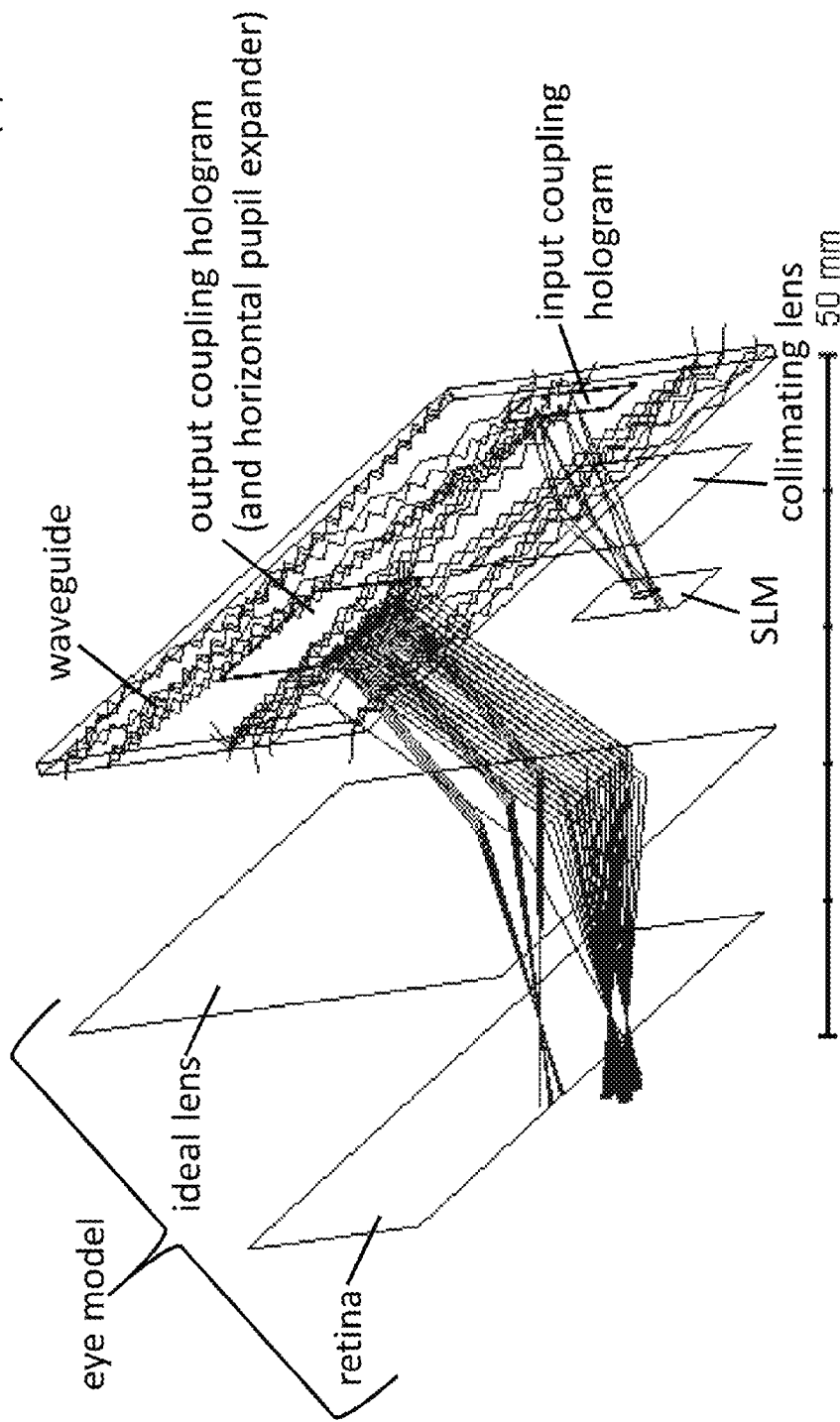

SPACE, TIME AND ANGULAR MULTIPLEXED DYNAMIC IMAGE TRANSFER FOR AUGMENTED REALITY DISPLAY

CROSS-REFERENCE TO RELATED APPLICATION

The present application is a National Stage Application filed under 35 U.S.C. 371 based on International Patent Application No. PCT/US2020/45579, filed on Aug. 10, 2020, which relates and claims priority to U.S. Provisional Application No. 62/884,546, entitled Space, Time and Angular Multiplexed Dynamic Image Transfer for Augmented Reality Display, filed Aug. 8, 2019, the entirety of each of which is hereby incorporated by reference.

FIELD OF THE INVENTION

The present disclosure is directed generally to augmented reality displays, and more particularly to space, time and angular multiplexed image transfer for augmented reality displays.

COPYRIGHT OR MASK WORK NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

It is highly anticipated that Near to Eye Displays (NED) for Augmented Reality (AR) will be implemented into common eye wear such as prescription, non-prescription, and sun glasses. The primary engineering challenge in developing such an AR display is a substantial reduction in the form factor from the state-of-the-art display devices, which each must include a micro display panel, illumination and imaging optics, and an image combiner, while the display must secure a wide Field of View (FOV), high resolution, a large horizontal and vertical eye-box size and high photon throughput.

Recently, the present inventors published a research paper on a novel display device, the Angular Spatial Light Modulator (ASLM) that enables angle-dependent image projection by employing a Digital Micromirror Device (DMD). See, B. Hellman and Y. Takashima, "Angular and spatial light modulation by single digital micromirror device for multi-image output and nearly-doubled étendue," Opt. Express 27, 21477-21496 (2019) https://www.osapublishing.org/oe/abstract.cfm?uri=oe-27-15-21477, incorporated herein by reference. The additional degree of freedom (DoF) in time multiplexed angular modulation of images by ASLM enables new optical architectures for an AR optical engine that tackles the aforementioned challenges from a completely different route.

SUMMARY

The present disclosure is directed to a design and implementation of a new optical architecture: space, time, and angular division multiplexed image transfer by DMD. The method, like various multiplexing methods employed in communication engineering, enables image transfer via an angular band-limited data channel such as an optical image guide by dynamically redistributing a signal into multiple domains such as space, time, angle, wavelength, and polarization.

The preliminary calculations show that with an ASLM employing a DMD equivalent to two stacked currently-available DLP3010 displays (produced by Texas Instruments, Inc., of Dallas, TX), the first order design achieves a 90° (Horizontal)×30° (Vertical) or larger full FOV, 1 arcmin/pixel resolution, a 24-bit Red Green Blue (RGB) frame rate of 30 fps, and a 20 mm×14 mm eye-box.

BRIEF DESCRIPTION OF THE DRAWINGS

The present invention will be more fully understood and appreciated by reading the following Detailed Description in conjunction with the accompanying drawings, in which:

FIG. 6 (b) illustrates the input, TIR propagation, and output coupling of a monochromatic NED, in accordance with an embodiment.

FIGS. 7 (c), (d), and (e) illustrates the greater angular extent available to meet the TIR condition if only red and green or blue and green are required instead of red and green and blue. This arrangement increases FOV to 40° from 20° of single image guide design, in accordance with an embodiment.

FIG. 12 (b) illustrates angular extent of image transferred through image guide. In the monochromatic design, each of the image guides supports about 30° (H)×30° (V) full FOV. A combined angular extent is also shown, in accordance with an embodiment.

FIG. 12 (c) illustrates simulated image by single layer image guide and combined image with eye lens of 16.7 mm focal length, in accordance with an embodiment.

DETAILED DESCRIPTION OF EMBODIMENTS

The present disclosure describes an ASLM capable of steering images into multiple directions. The ASLM is capable of steering different images into multiple directions by employing time sequenced patterns and redirection of those image patterns into different directions, or image steering. For the image steering, diffraction-based image steering by a micromirror array of the DMD is proposed. The following articles are hereby incorporated herein by reference:

B. Hellman and Y. Takashima, "Angular and spatial light modulation by single digital micromirror device for multi-image output and nearly-doubled étendue," Opt. Express 27, 21477-21496 (2019), https://www.osapublishing.org/oe/abstract.cfm?uri=oe-27-15-21477; B. Hellman, T. Lee, J.-H. Park, and Y. Takashima, "Gigapixel and 1440-perspective extended-angle display by megapixel MEMS-SLM", Optics Letters (posted 22 Jul. 2020), https://doi.org/10.1364/OL.395663; B. Smith, B. Hellman, A. Gin, A. Espinoza, and Y. Takashima, "Single chip lidar with discrete beam steering by digital micromirror device," Opt. Express 25(13), 14732-14745 (2017), https://www.osapublishing.org/oe/abstract.cfm?&uri=oe-25-13-14732; T. Nakamura, Y. Takashima, "Design of discretely depth-varying holographic grating for image guide based see-through and near-to-eye displays," Opt. Express 26, 26520-26533 (2018), https://www.osapublishing.org/oe/abstract.cfm?uri=oe-26-20-26520.

In addition to the diffraction based image steering, other methods such as image steering by time and angular multiplexed illumination are also feasible, for example, B. Hellman and Y. Takashima, "Angular and spatial light modulation by single digital micromirror device for multi-image output and nearly-doubled étendue," Opt. Express 27, 21477-21496 (2019) https://www.osapublishing.org/oe/abstract.cfm?uri=oe-27-15-21477. Moreover, since the DMD is a reflective and passive micro display, additional DoFs in multiplexing, such as angle, wavelength, and polarization are available.

One focus of the present invention is to identify the optimum optical architecture for a NED that fully utilizes the DoFs of an ASLM to achieve a full color, wide FOV, high resolution, large horizontal and vertical eye-box size, high photon throughput optical architecture.

Figure 1:
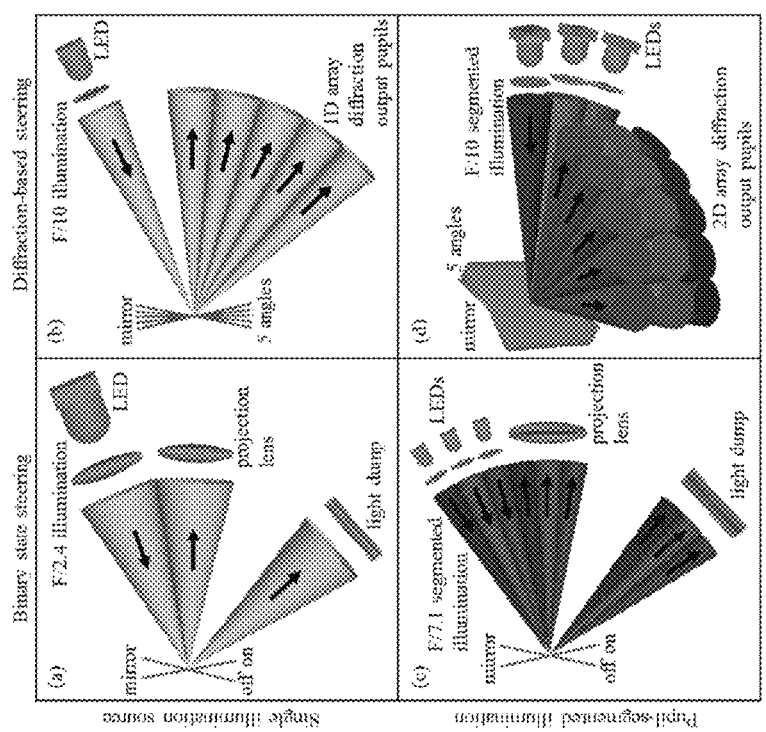
FIG. 1 illustrates variation of the ASLM-based projection methods including (a) Binary and single source state steering, (b) Diffraction and single source steering, (c) Binary and multiple source steering, and (d) Diffraction and multiple source steering, in accordance with an embodiment.

To overview the capability of the ASLM, FIG. 1 depicts four variations of ASLM-based projection methods including (a) binary and single source state steering, (b) diffraction and single source steering, (c) binary and multiple source steering, and (d) diffraction and multiple source steering.

In FIG. 2, an experimental result of time multiplexed diffraction/multiple source image steering is shown. As FIG. 2 shows, an ASLM can steer different images into multiple and 2-dimensional directions in a time multiplexed manner.

In wireless and optical fiber communication, various multiplexing methods such as, Time Division Multiple Access (TDMA), Frequency Domain Multiple Access (FDMA), Code Division Multiple Access (CDMA), and Wavelength Division Multiplexing (WDM) are employed. Usually, such communication channels are bandlimited in frequency. The multiplexing techniques enable transferring large bandwidth data via band-limited communication channels with a good fidelity Signal-to-Noise Ratio (SNR). There, distribution of the modulated signal to multiple data domains (space, time, frequency, polarization, and code) followed by de-modulation and re-combination of the distributed and bandlimited signal is employed to recover full and original bandwidth of the signal to fully utilize and increase the channel capacity.

Optical image transfers in AR displays face similar challenges to those found in data communication. In AR devices, data (image) is transferred from a micro display to a retina. As a communication channel, free space and/or higher index medium such as image guide or fiber array is used. In AR devices, a large angular and spectral bandwidth for the image, such as a full FOV of 90° for RGB image needs to be transferred via angular bandwidth (or FOV) limited optical image guide. Also, high fidelity in angular resolution, such as 1 arc min/pixel, is required for the image transfer.

Consequently, there exist two major challenges. First is a micro display device which is capable of distribution/re-distribution across multiple domains and is a device that supports such a drastically increased total amount of discrete information points. The display device also requires a fast and massive data modulation device such as a fast micro-display or Spatial Light Modulator (SLM). The second challenge is an optical architecture that supports the required bandwidth and intelligently allocates bandwidth into multiple domains.

The first challenge is addressed by the ASLM. The ASLM can dynamically modulate an image and the angles along which images are transferred. The ASLM dynamically selects a communication channel which is not a capability of conventional micro displays. Also for the second challenge, the ASLM has an effective pixel count which is comparable or larger compared to the state of the art of LCoS micro display, for example, B. Hellman and Y. Takashima, "Angular and spatial light modulation by single digital micromirror device for multi-image output and nearly-doubled étendue," Opt. Express 27, 21477-21496 (2019) https://www.osapublishing.org/oe/abstract.cfm?uri=oe-27-15-21477.

Figure 3:
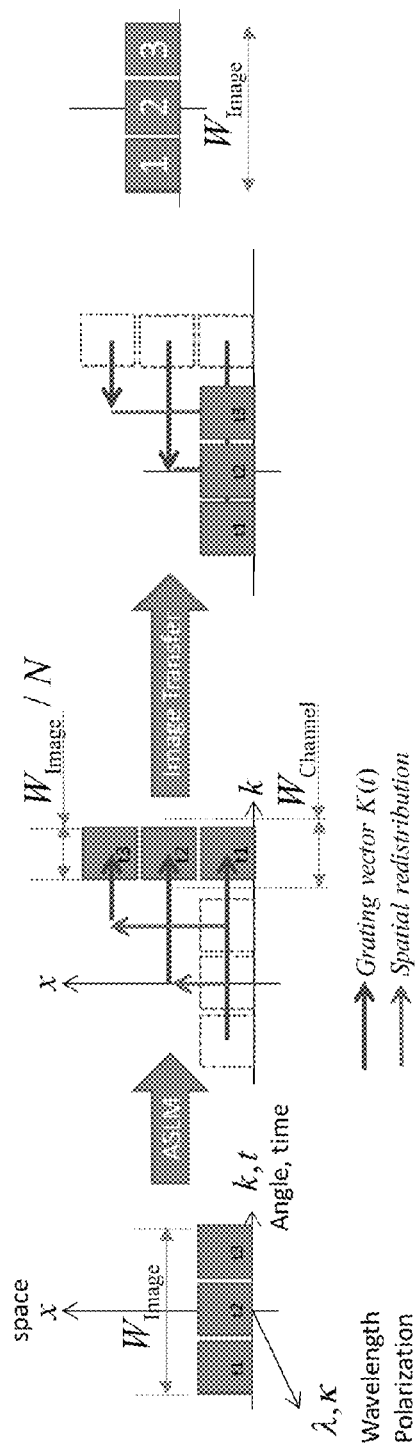
FIG. 3 schematically depicts how the ASLM enables transferring large bandwidth data via bandlimited channel(s), in accordance with an embodiment.

Being inspired by solutions in communication engineering, and with the proof of the aforementioned ASLM display device by fast DMD, the present invention evolves from the basic idea of multiplexed data transfer for NED in AR applications as depicted in FIG. 3. The ASLM display device is capable of dynamically distributing/re-distributing a signal into multiple domains. It is therefore feasible to support a wide FOV by dividing and multiplexing a signal into multiple domains. The ASLM redistributes images in angle and space by optics and/or propagation.

FIG. 3 schematically depicts how the ASLM enables transferring large bandwidth data via bandlimited channel(s). In theory, the image information can be mapped in 5-dimensional space, in space (x), time (t), angle (k), wavelength (λ) and polarization (κ), for large collective bandwidth data transfer. Here, we consider only space (x), time (t), and angle (k), for simplicity.

The ASLM is fundamentally a programmable blazed grating with a grating vector (K-vector, K(t)) that is electrically controlled and can be time multiplexed on the order of milliseconds. At each of the times $t_1$, $t_2$ and $t_3$, the full FOV (angular bandwidth $W_{image}$) is divided into sub-FOVs (ASLM projects only one sub-FOV at one time) such that the sub-FOVs have a bandwidth lower than the channel limit: $(W_{image}/N) < W_{channel}$ where $W_{channel}$ is the maximum FOV (or angular bandwidth) that the TIR image guide can support. The grating vector is modulated in time, K(t)=nK, so that the sub-FOVs are shifted within $W_{channel}$. During time modulation of the grating vector, the ASLM distributes the sub-FOVs among separate image guide layers. After the sub-images transfer via spatially multiplexed image guides, the process is reversed so that original image is retrieved in (x, k) space. Since the image modulation speed is ~10 kHz, the entire process occurs within a substantially short period of time as compared to the flicker frequency of the human eye. This allows the time multiplexed images to be perceived as non-time multiplexed. Note that ASLM can also modulate space (x) by itself and/or with auxiliary optics, for example, B. Hellman and Y. Takashima, "Angular and spatial light modulation by single digital micromirror device for multi-image output and nearly-doubled étendue," Opt. Express 27, 21477-21496 (2019) https://www.osapublishing.org/oe/abstract.cfm?uri=oe-27-15-21477. After image transfer via the image guide, the process is reversed so that original image is retrieved in (x, k) space. This technique of course can be expanded to wavelength (λ) and polarization (κ) domains. Note that one may notice the ASLM's modulation in space domain or angle domain can be also used to increase the size of eye-box by time multiplexing.

Figure 4:
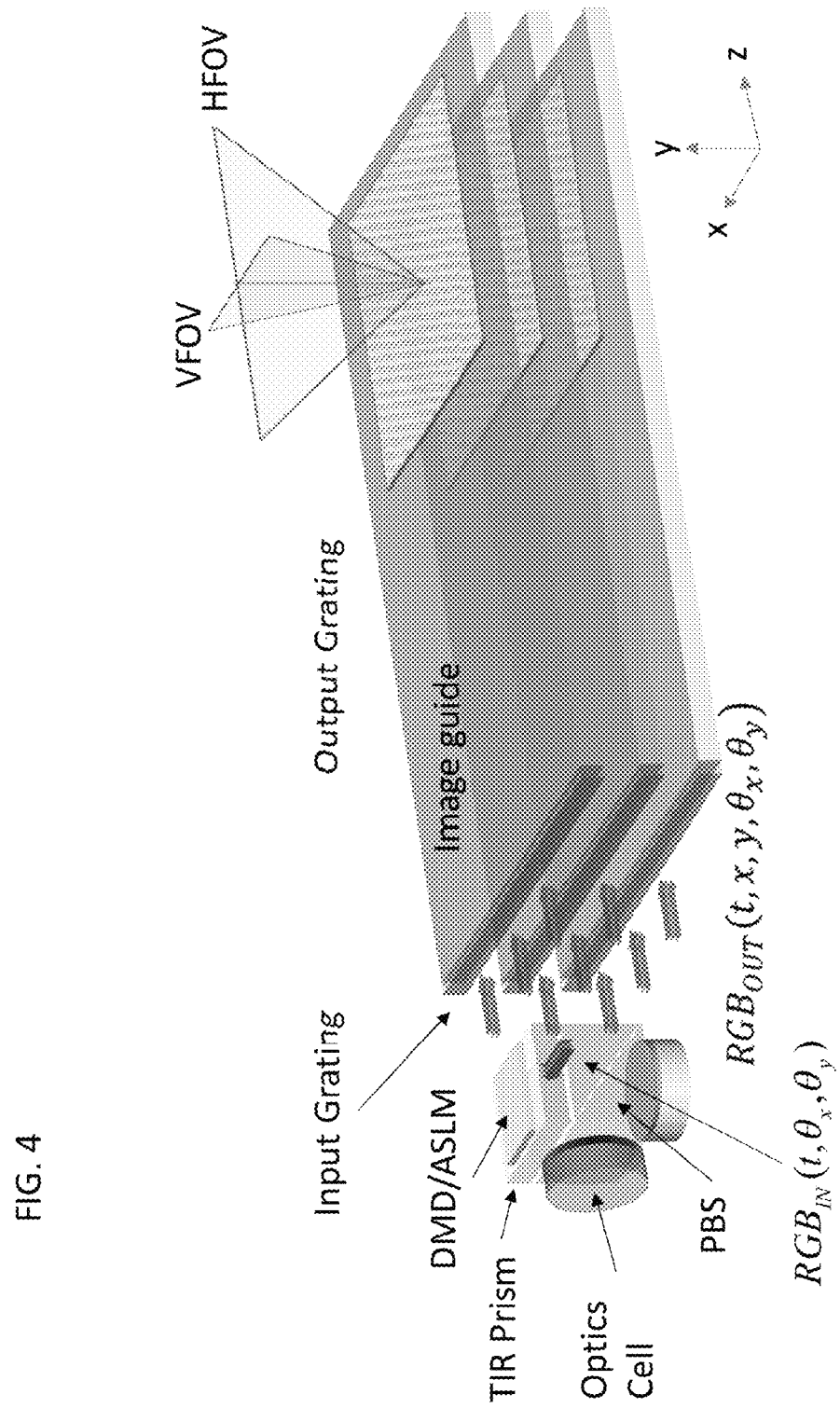
FIG. 4 schematically depicts an example of Space, Time, and Angular Division multiplexed image transfer for AR display (STAD-AR), in accordance with an embodiment.

In FIG. 4, an example of Space, Time, and Angular Division multiplexed image transfer for AR display (STAD-AR) is schematically depicted. The key feature of STAD-AR is the aforementioned space, time and angular modulated image projection that enables transferring a large angular extent of image information (for large FOV and high resolution image) via a bandlimited (or small FOV) Total Internal Reflection (TIR) mode in a glass slab, and potentially eliminates the vertical pupil expansion grating by following way.

First, time and angular modulated light [$R_{in}(t, \theta_x, \theta_y)$, $G_{in}(t, \theta_x, \theta_y)$, $B_{in}(t, \theta_x, \theta_y)$]=$RGB_{IN}(t, \theta_x, \theta_y)$ illuminates the ASLM/DMD via a TIR prism. The ASLM doubly modulates the input light in spatial and angular dimensions over time in addition to the aforementioned angular modulation of the illumination light. A monolithic catadioptric (reflective-refractive) optical system, consisting an optics cell and a Polarized Beam Splitter (PBS), converts 2D images into an ensemble of plane waves, represented as [$R_{in}(t, x, y, \theta_x, \theta_y)$, $G_{in}(t, x, y, \theta_x, \theta_y)$, $B_{in}(t, x, y, \theta_x, \theta_y)$]=$RGB_{out}(t, x, y, \theta_x, \theta_y)$. The catadioptric (reflective-refractive) folds the optical path in glass to reduce the package size. The time, angle, and space modulated signal is injected via input gratings and transferred via image guides which are angularly shifted and bandlimited. The approach splits the total FOV into sub-FOVs so that each of the sub-FOVs are transferred via spatially separated image guides that are individually addressed by the ASLM and optics. The image guide re-employs TIR for image transfer. This technique can be expanded to additional multiplexing in wavelength (λ) and polarization (κ) domains. It is known that this method is angular bandlimited because an image guide is angular bandlimited. In the proposed approach, the spatially and angularly modulated light allows the total FOV to by split into sub-FOVs so that each of the sub-FOVs are transferred via a separate image guide. In this manner, the angular bandwidth is divided into smaller packets and those packets are re-distributed among multiple image guides. Finally, an output grating demodulates the sub angular bands so that the full color and full angular bands are retrieved to form an image perceived by a human eye.

Note that the ASLM's capability to steer images over the space is also effective to reduce the optics volume (target: <(10 mm)³) and simultaneously expand the vertical eye-box size in a time multiplexed manner. Without employing pupil expansion gratings, the size of the exit pupil of the optics has to be comparable to the size of the eye-box which induces a serious obstacle to reducing the volume of the optics. Therefore, optics with a small exit pupil size require pupil expanding gratings. However, those gratings require increased surface area of the image guide which increases overall packaging size. Additionally, overall photon throughput from the source to the eye decreases due to undesired diffraction orders which do not contribute to image formation. Since the ASLM can steer images, the ASLM decouples the optics exit pupil size from the eye-box size. The exit pupil size of the optics can be expanded in a 1- or 2-dimensional manner by distributing images in space. Image steering by the ASLM can keep the volume of the optics small without (or with a reduced area of) pupil expanding gratings. The following section describes how the architecture employing an ASLM micro display can potentially enable an optical architecture with wide-FOV, high resolution, small volume, and a large eye-box size.

Figure 5:
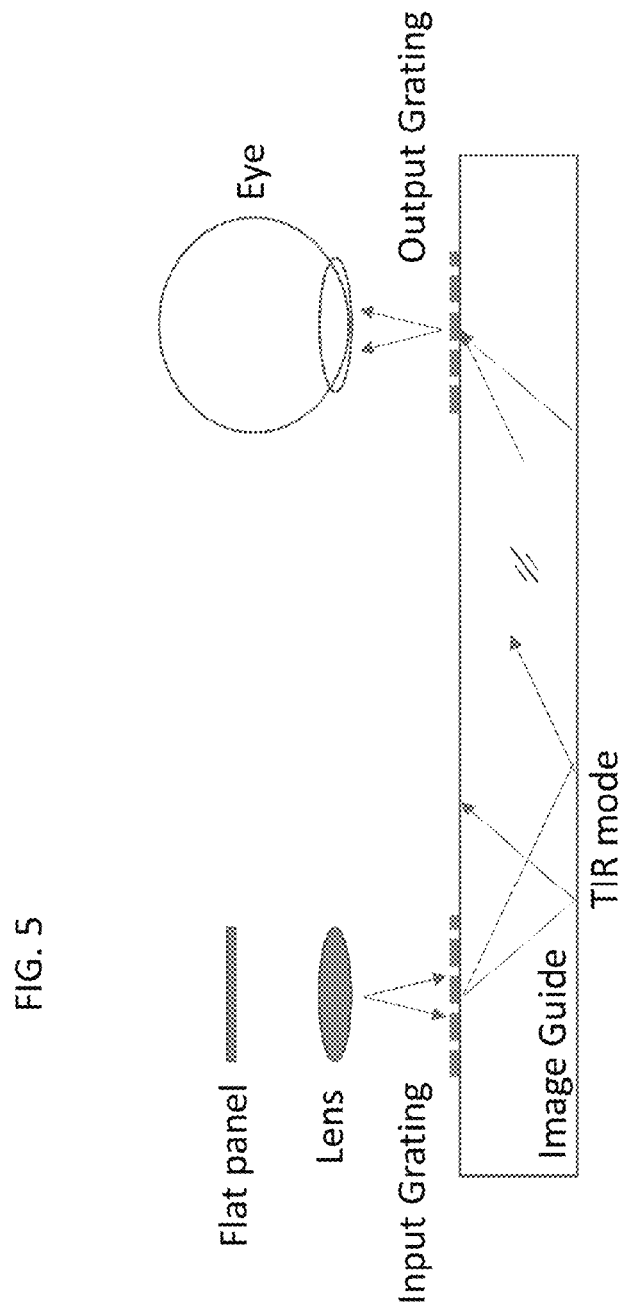
FIG. 5 schematically illustrates optical architecture of NED, in accordance with an embodiment.

Physical Bottle Neck in Optics for Near to Eye Displays: An Angular Bandwidth Limited Optical Channel For optical architectures of NEDs, input and output gratings are employed with an image guide (FIG. 5). Typically, an additional grating that expands the size of the eye-box is employed. Here, without losing generality, we discuss the functionality of the image guide while only considering the input and output grating. A micro display device is placed at the front focal plane of a lens that converts the spatial distribution of the image into an ensemble of k-vectors in an air propagation mode. The input grating is placed at the back focal plane of the lens which couples the k-vectors in the air propagation mode into TIR modes. After multiple TIRs inside glass slab, the TIR modes are outcoupled to the air propagation mode again by the output grating. After interaction with the output grating, the ensemble of k-vectors in the air propagation mode has the same distribution of those generated by the micro display lens, if we ignore variation by multiple interactions with the input and/or output holograms. The output k-vectors are then converted to a spatial image on the retina by the eye lens.

Figure 6A:
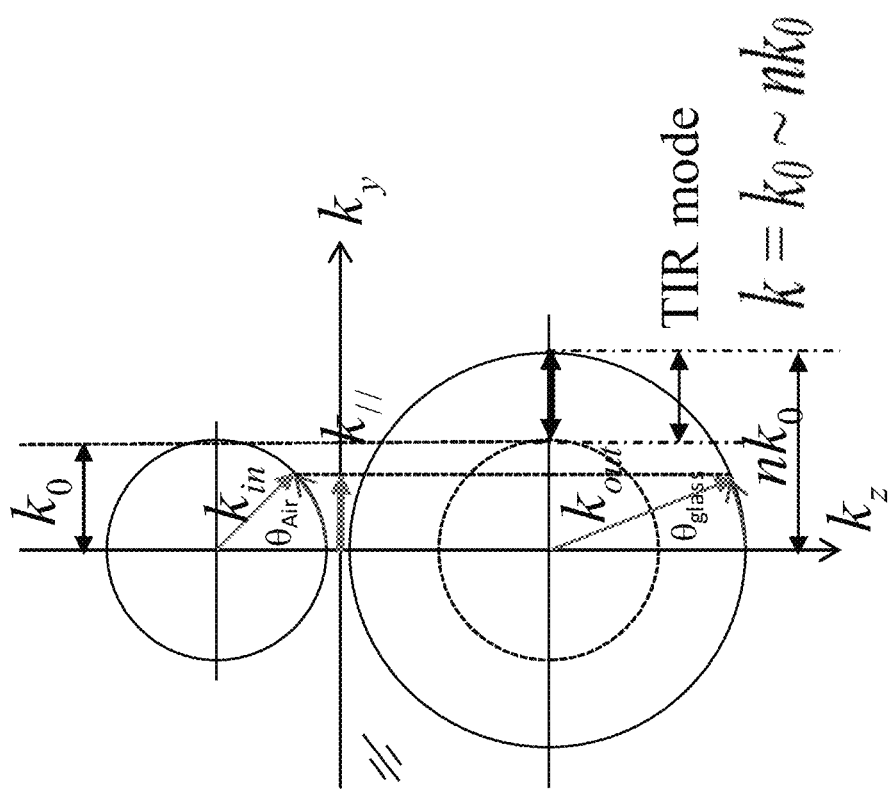
FIG. 6 (a) illustrates Ewald sphere representation of optical architecture of NED, in accordance with an embodiment.

The process, and benefit of the ASLM in a NED, can be illustrated by using the Ewald Sphere (ES) (or circle for 2D) as depicted in FIG. 6(a). FIG. 6(a) illustrates Ewald spheres corresponding to air propagation and TIR modes, and the refraction at a boundary between air and glass. The ES graphically describes how refraction and/or diffraction occurs at an air-glass interface. In an isotropic and homogenous medium, the ES has a radius of $(2\pi n/\lambda_0)=k_0$, where n is the index of refraction and $\lambda_0$ is the wavelength in free space. Consider a plane wave traveling at an angle of $\theta_{air}$ measured from the $k_z$-axis, as depicted by $k_{in}$ in FIG. 6(a). The transverse (y) component of the k-vector is given by $k_y=k_{//}=n_i k_0 \sin(\theta_i)$, where i=air or glass, preserves its value at the air-glass interface through refraction. This is a graphical representation of Snell's law. The k-vector in glass after refraction, $k_{out}$, can be graphically identified by drawing a line between the origin of the lower (glass) ES in FIG. 6(a), and the intersection point of (1) the vertical line $k_y=k_{//}=n_i k_0 \sin(\theta_i)$ and (2) the ES boundary in glass. Additionally, TIR occurs at $k_y=k_{//}=n_{glass} \sin(\theta_{glass})>1$. This limits the allowable transverse component of the k-vector in the TIR mode within the band: $k_0<k_y<nk_0$, as depicted in 6(a) as "TIR mode." The radius of the ES in air propagation and TIR modes are $2\pi/\lambda_0=k_0$ and $2\pi n/\lambda_0=nk_0$, respectively, where n is the index of refraction of the medium, and $\lambda_0$ is the wavelength in free space.

Figure 6B:
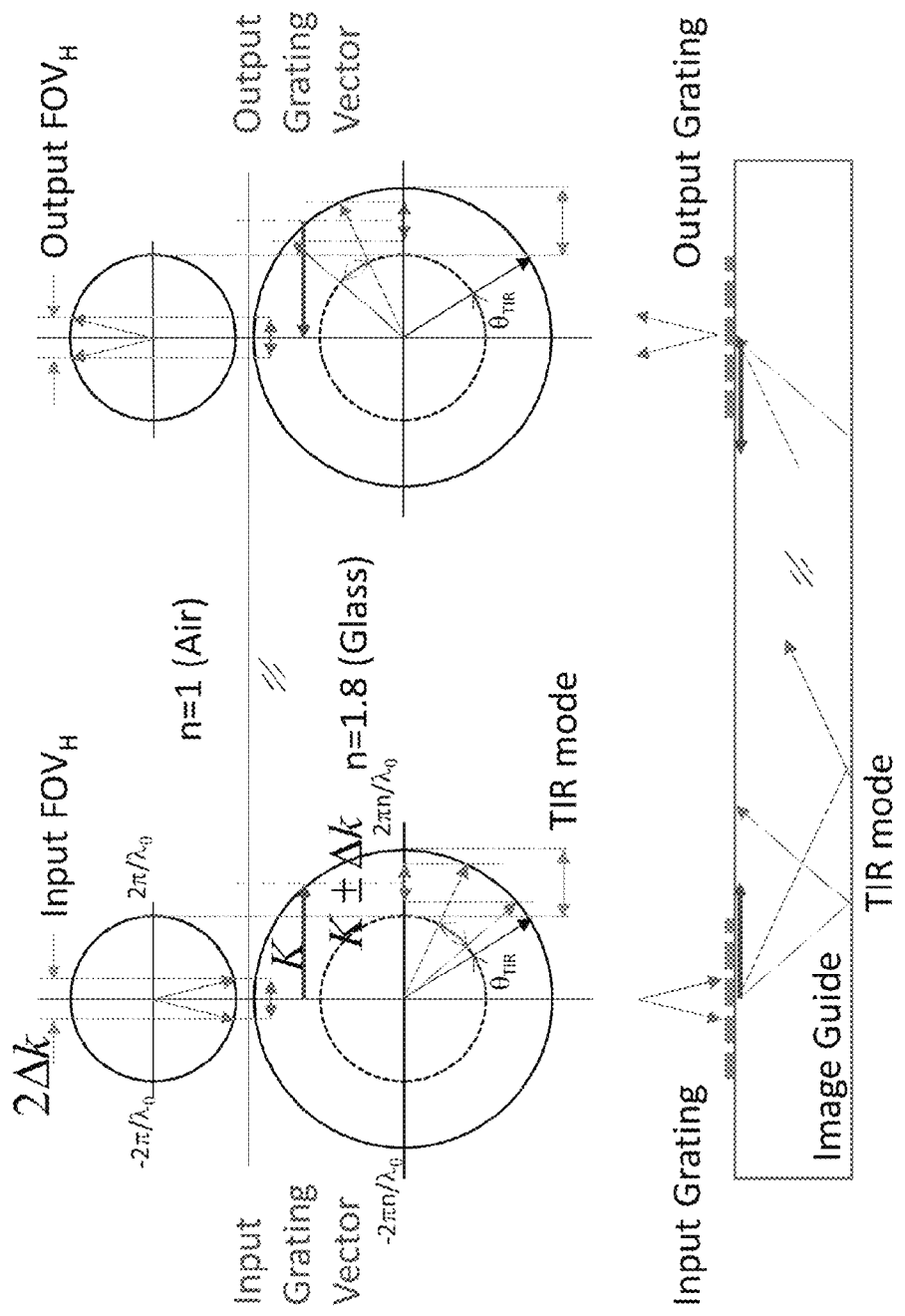

FIG. 6(b) shows the input, TIR propagation, and output coupling of a monochromatic NED. This graphical representation of refraction is also applicable for diffraction of an ensemble of k-vectors (or an image with a finite FOV) by a grating placed at an air-glass interface (or input hologram in an AR display). At the air-glass interface, the transverse component of the k-vector preserves across the air-glass interface. Suppose the k-vector components of a NED in air distributes over $\pm\Delta k$. The boundaries of the image FOV are shown by the two vectors in the top-left air ES in FIG. 6(b). The grating vector $K=2\pi/\Lambda$ where $\Lambda$ is period of grating that offsets the grating vectors from $\pm\Delta k$ to $K\pm\Delta k$ within the bandwidth of the TIR mode. By grating vector K, the transverse components of the set of k-vectors, of width $2\Delta k$, are shifted to the TIR mode $K-\Delta k<k_{//}<K+\Delta k$, as shown by the horizontal arrows on the horizontal axis in the bottom-left glass ES in FIG. 6(b). After the TIR propagation inside the image guide, the process is reversed by the output grating to retrieve the original ensemble of k-vectors, as shown on the two right ESs in FIG. 6(b). The ES construction shows the bandwidth of the transverse k-vector in glass is limited to $(n-1)k_0$. Therefore, a higher index of refraction is desirable to accommodate a larger FOV. Even with n close to 2, such as LAH58 glass, the full FOV is still limited to less than 60°.

Figure 7:
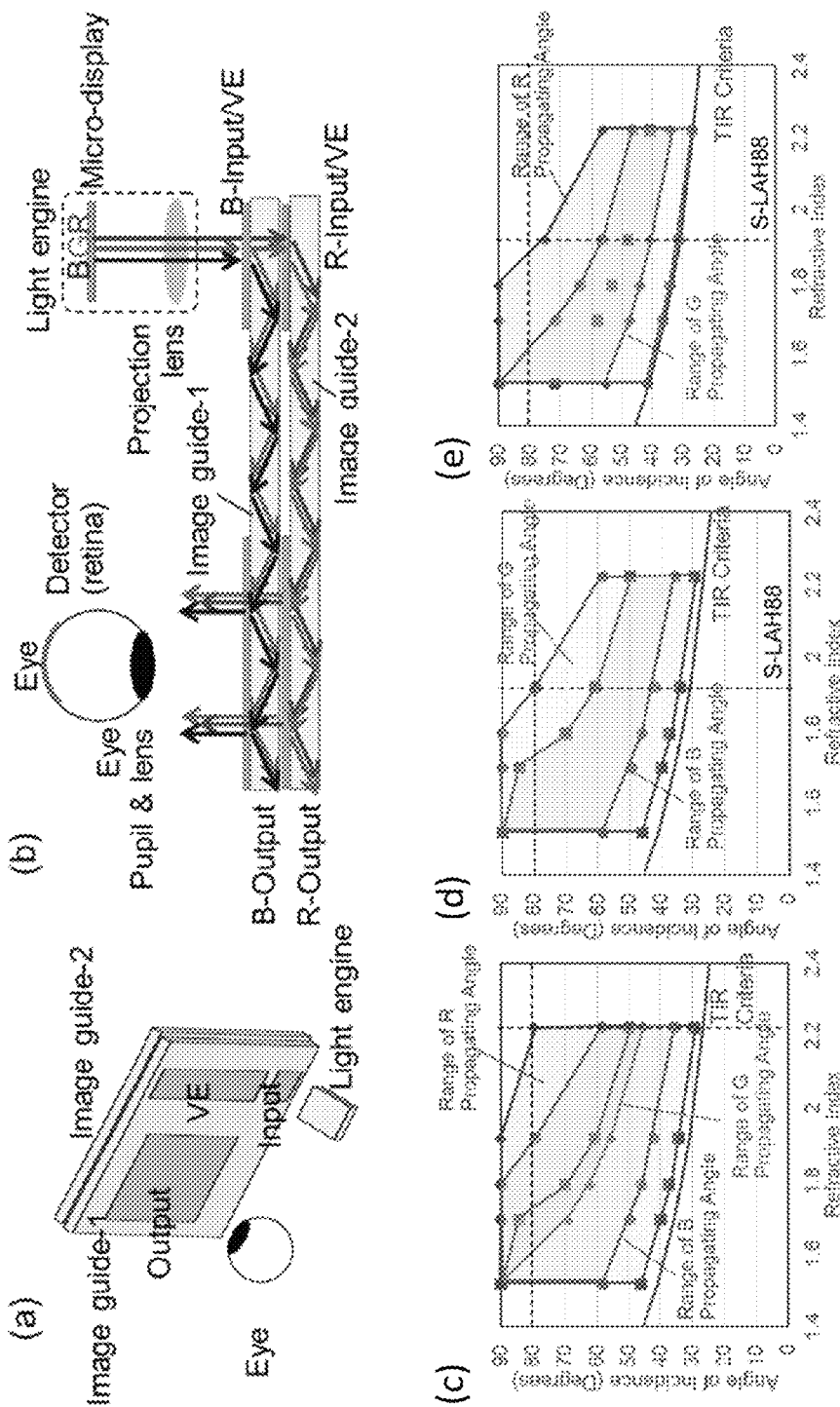
FIGS. 7 (a) and (b) illustrate a two-layer image guide design by University of Arizona. Two image guides propagate green light.

When full RGB colors are incorporated, the allowable extent of k-vectors in TIR mode becomes even smaller, since the usable extent of the k-vectors in the glass mode is the overlapping region of three TIR modes instead of one as discussed in reference T. Nakamura, Y. Takashima, "Design of discretely depth-varying holographic grating for image guide based see-through and near-to-eye displays," Opt. Express 26, 26520-26533 (2018); https://www.osapublishing.org/oe/abstract.cfm?uri=oe-26-20-26520 and later in detail (see FIG. 9). The analysis, published in Optics Express in 2018 indicates that the full FOV for full RGB color needs to be even smaller, about 20° with single image guide (FIG. 7(b)), and 40° with two layered image guide with n~2.0 (FIG. 7(b)) (T. Nakamura, Y. Takashima, "Design of discretely depth-varying holographic grating for image guide based see-through and near-to-eye displays," Opt. Express 26, 26520-26533 (2018); https://www.osapublishing.org/oe/abstract.cfm?uri=oe-26-20-26520).

Also, with a single panel, pixel resolution is determined by full FOV divided by number of pixels. For example, a 1920 pixel panel with 40° full FOV provides roughly 1.25 arc min resolution which is close to the resolution of the eye. To achieve a full FOV of 90° with 1 arc min resolution, at least 4K horizontal pixels are needed, provided there is an optical method to accommodate a 90° FOV while transferring the image via an image guide.

The ES k-vector analysis indicates that for full RGB color, high resolution and wide FOV NED, division of the extent of the k-vector into multiple segments (e.g., multiple image guides) and re-arrangement of the bandwidth in time, space, and angle is an enormous contribution for NED technology advancement due to the limited angular bandwidth in a TIR mode.

Figure 8:
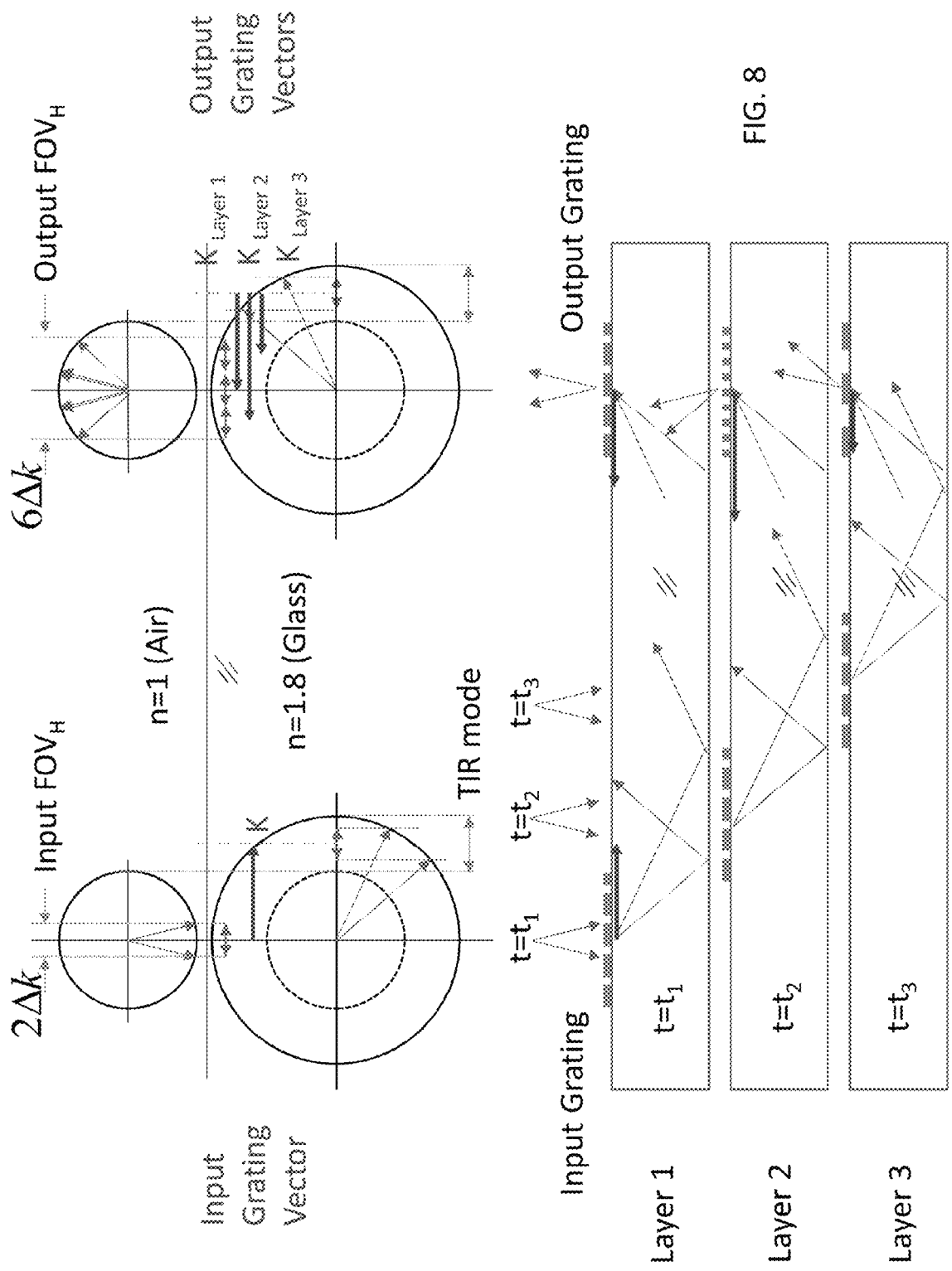
FIG. 8 illustrates an Ewald sphere representation of an optical architecture of a monochromatic and multi-layer NED, in accordance with an embodiment.

One of the possible solutions to solve the challenge of transferring a wide FOV through bandlimited channels is depicted for monochromatic illumination in FIG. 8. Suppose the total angular bandwidth is divided into multiple $N_L$ image guides. The angular bandwidth supported by single image guide is $2\Delta k$. In this configuration, it is possible to decrease the index refraction of the image guide and/or increase total FOV or angular bandwidth by factor $N_L$, to $2\Delta k N_L$. Re-mapping to the extended angular space is employed by allocating a different grating vector for each image guide. This concept is schematically depicted in FIG. 8 for $N_L=3$. The total image bandwidth is increased by a factor of 3 by time multiplexing.

In FIG. 8, at time $t=t_1$, a part of the total FOV (i.e., 30° out of 90° full FOV) is displayed on the ASLM, and optics inject the input grating with an image corresponding to angular extent of $-\Delta k$ to $+\Delta k$. The input grating couples light from air to TIR mode, and the light is extracted by output grating having the same period as the input grating, for instance $K_{output}=K_{input}=K_{Layer1}$. As far as the Layer+1 image guide is concerned, the process is identical to the conventional image guide system depicted in FIG. 5. However at time $t=t_2$, a flat panel displays information corresponding to the display angular extent of $-3\Delta k$ to $-\Delta k$, however the physical angular extent is still $-\Delta k$ to $+\Delta k$ so that the TIR condition is satisfied (such as $-45°$ to $-15°$ via Layer 2 with $K_{input}=K_1$, $+15°$ to $+45°$ via Layer 3 with $K_{input}=K_1$). Note that the input grating of Layer 2 image guide is spatially offset to the input grating of Layer 1. The ASLM's angular modulation capability can be mapped by lenses or mirrors to spatially separate the light corresponding to different patterns directed in different directions to assure photon throughput of each angular extent subdivision is accurately coupled into each corresponding layer. Upon interaction with the output hologram, the grating period is decreased, or magnitude of K-vector is increased, as $K_{Layer2}>K_{Layer1}$ so that the output angular extent covers $-3\Delta k$ to $-\Delta k$. Similarly, the magnitude of grating vector of Layer 3 is designed as so that the output angular extent covers $+\Delta k \sim +3\Delta k$. To reiterate, the input grating vectors are all identical, however the output grating vectors $K_2$ and $K_3$ (not equal to $K_1$) couple the same angular TIR bandwidth to the air mode with different output angles corresponding to the sub-FOVs. In this time multiplexed manner, the total angular bandwidth is increased by number of layers $N_L=3$.

FIG. 8 depicts a monochromatic case. For RGB full color, the same principle is used while taking into account the variation of the radius of the ES for each RGB wavelength. The subdivision of total FOV decreases angular extent per pixel. This is also enabled by the fast modulation speed of a DMD based ASLM.

Figure 9:
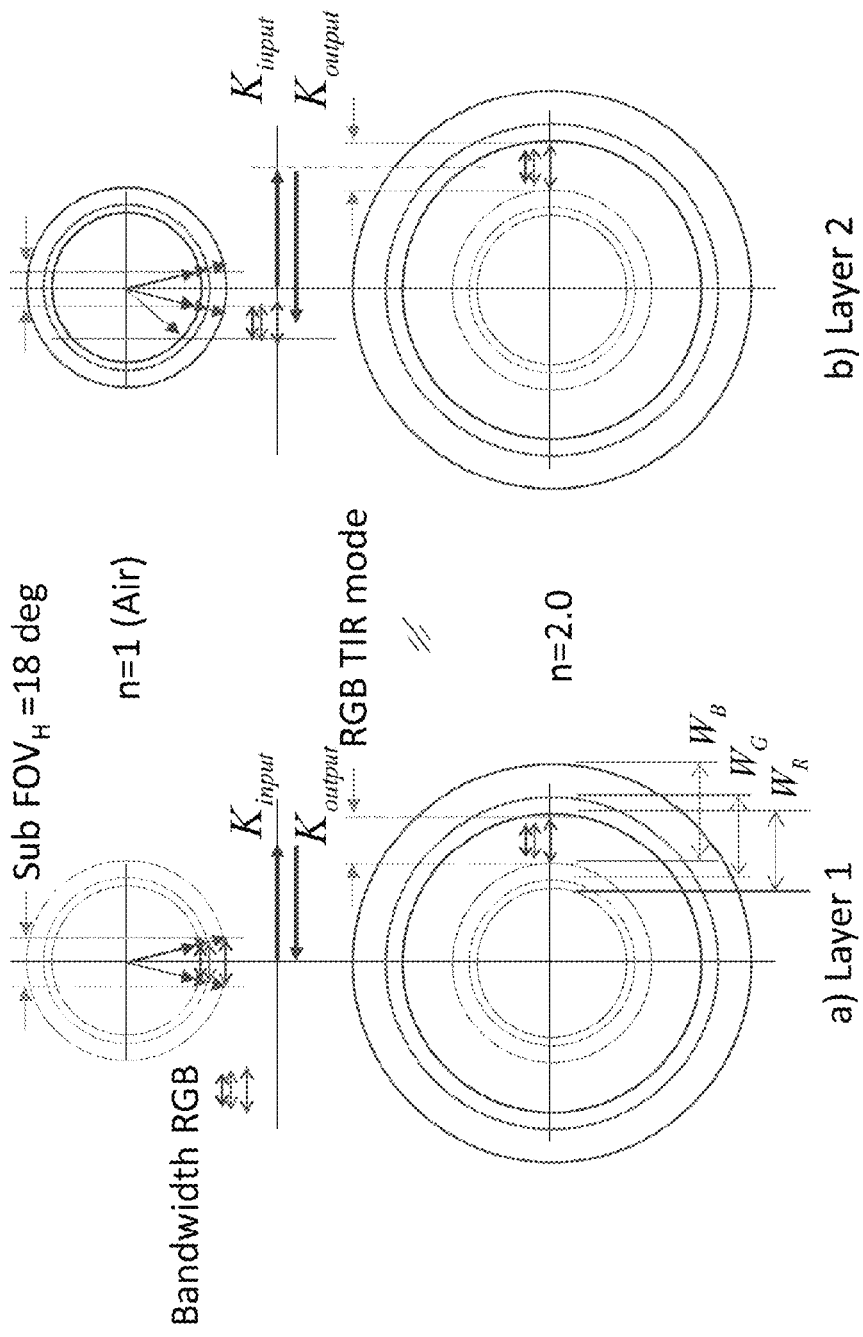
FIG. 9 illustrates an Ewald sphere representation of an optical architecture of RGB color and multi-layer NED with a static grating, in accordance with an embodiment.
Figure 10A:
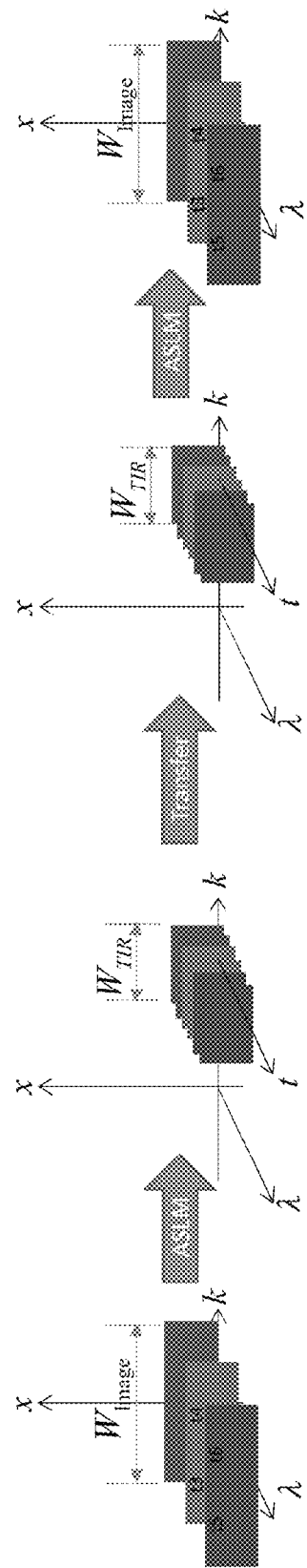
FIGS. 10 (a) and (b) illustrate bandwidth management by ASLM to transfer a 90° FOV image via single layer image guide with n=1.8, and 3-layer image guide, respectively in accordance with an embodiment.
Figure 10B:
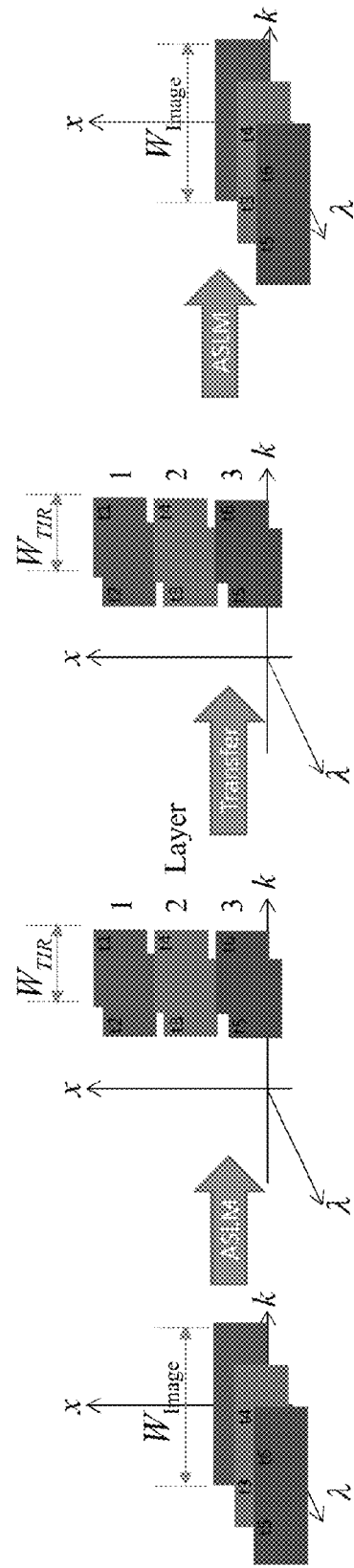

RGB Sub Angular Bandwidth Management:

In the previous example, input and output gratings are static, i.e., the surface grating is affixed to the image guide. Also, central k-vector of the each of the sub angular bands is placed at k=0. In this configuration, as far as number divisions $N_L$ is large enough, a full color and wide FOV RGB image can be propagated, for example a full FOV 90° is divided in to 5 sub-FOV of 18° each. FIG. 9 shows examples of a color and bandwidth management with such static grating case. There we assume 18° full sub-FOV and three colors, $\lambda_{01}=656$ nm, $\lambda_{02}=587$ nm, $\lambda_{03}=486$ nm. FIGS. 9(a) and 9(b) shows angular bandwidth allocation for Layer 1 and Layer 2 image guides, respectively. For each of the wavelengths, the magnitude of grating vectors are unchanged while magnitude of k-vectors or radius of the ES varies for each of the RGB colors. Accordingly, the bandwidth and central angular frequency varies. It is noted that the full color RGB bandwidth is given by the intersection of each of the RGB bandwidth, $W_{RGB}=W_R \cap W_G \cap W_B$ is substantially smaller compared to each of the bandwidth $W_R$, $W_G$, $W_B$. As FIG. 9 shows, by employing subdivision of bandwidth, wide FOV image transfer is feasible. However, if both the grating vector K and initial angular extent and central k-vectors of sub bands are intelligently managed and allocated, a substantial reduction in the number of layers is feasible by the following observations: The TIR bandwidth (or full FOV supported by image guide) is solely determined by index of refraction of the image guide, and is given by 2 $\sin^{-1}[n(\lambda)-1)/2]$. For example, n=1.8 material supports 47°. This indicates that to accommodate 90° FOV with a single image guide, total of 6 multiplexing (2 in angular and 3 in color) is needed to achieve full FOV of 90° provided grating vectors and central k-vector as well as bandwidth of RGB images which are appropriately arranged and time multiplexed (FIG. 10).

This time-multiplexed approach employing programmable grating K-vector for time-angular multiplexing and de-multiplexing has a fundamental benefit over the conventional static grating K-vector approach. FIG. 10(a) depicts an ultimate single layer implementation, or number of layers $N_L=1$. However, $N_L$ is still a strong DoF as a design parameter. By increasing $N_L$, is possible to even support full RGB with a lower refractive index plastic substrate such as polycarbonate with static grating K-vectors for input and/or output gratings. For the multilayer image guide system, an example of bandwidth management is depicted in FIG. 10 (b). An example of optical architectures is depicted in FIG. 11. As examples depicted in FIGS. 10 (a), and (b) show, ASLMs can be situated at both the input and output sides, or either one ASLM at either side and static grating(s) with such bandwidth management in time, 2-dimensional space, 2-dimensional angle, and polarization is employed.

Figures 2A, 2B:
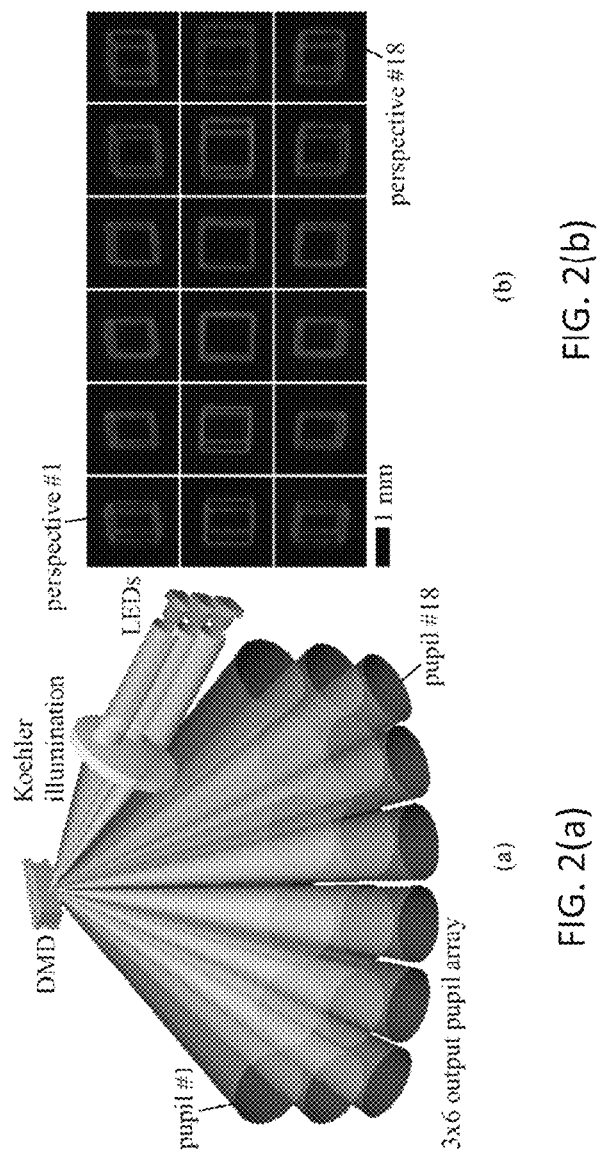
FIG. 2(a) is an ASLM 2D multi-view display by 3-LED pupil segmented Koehler illumination where each vertically-stacked LED has six independent horizontally steered output diffraction orders for a 3×6 array of outputs for direct pattern viewing on the surface of the DMD. Single-point illumination is shown to accurately depict independent pupil steering, but extended-area illumination is assumed for diffraction-based pattern steering.
FIG. 2(b) is photos of the 18 angle-dependent patterns, arranged by viewing position corresponding to the 2D output pupil array, in accordance with an embodiment.

As explained previously, the ASLM can steer "images" into different directions. The mechanism is either diffraction-based with a single source, and/or multiple source illumination, see B. Hellman and Y. Takashima, "Angular and spatial light modulation by single digital micromirror device for multi-image output and nearly-doubled étendue," Opt. Express 27, 21477-21496 (2019) https://www.osapublishing.org/oe/abstract.cfm?uri=oe-27-15-21477. For example, 6×3 images with different perspectives are generated by diffraction based image steering in 6 horizontal directions, and by geometrical optics based image steering in 3 vertical directions, as shown in FIG. 2(b). Diffraction based image steering requires fewer number of sources, while geometrical based steering has an advantage in image brightness depending on the illumination source. FIG. 11(a) depicts coupling from air to TIR mode by out-of-plane coupling with input grating. Side-coupling as depicted in FIG. 11 (b) is a feasible and may be a preferable arrangement for packaging.

One predictable challenge of the static grating method is compensation for mis-registration of RGB images among different layers of the image guides. Since the magnitudes of the grating vectors of input and output gratings are not identical, except for Layer 1, pre-distortion of RGB images is needed to compensate chromatic shift of image among the layers. This approach has been experimentally proved by Stanford group in application of Holographic Data Storage System as reported and is applicable to the disclosed invention, see E. S. Bjornson, M. C. Bashaw, and L. Hesselink, "Digital quasi-phase-matched two-color nonvolatile holographic storage," Appl. Opt. 36, 3090-3106 (1997) https://www.osapublishing.org/ao/abstract.cfm?uri=ao-36-14-3090).

Figure 12B:
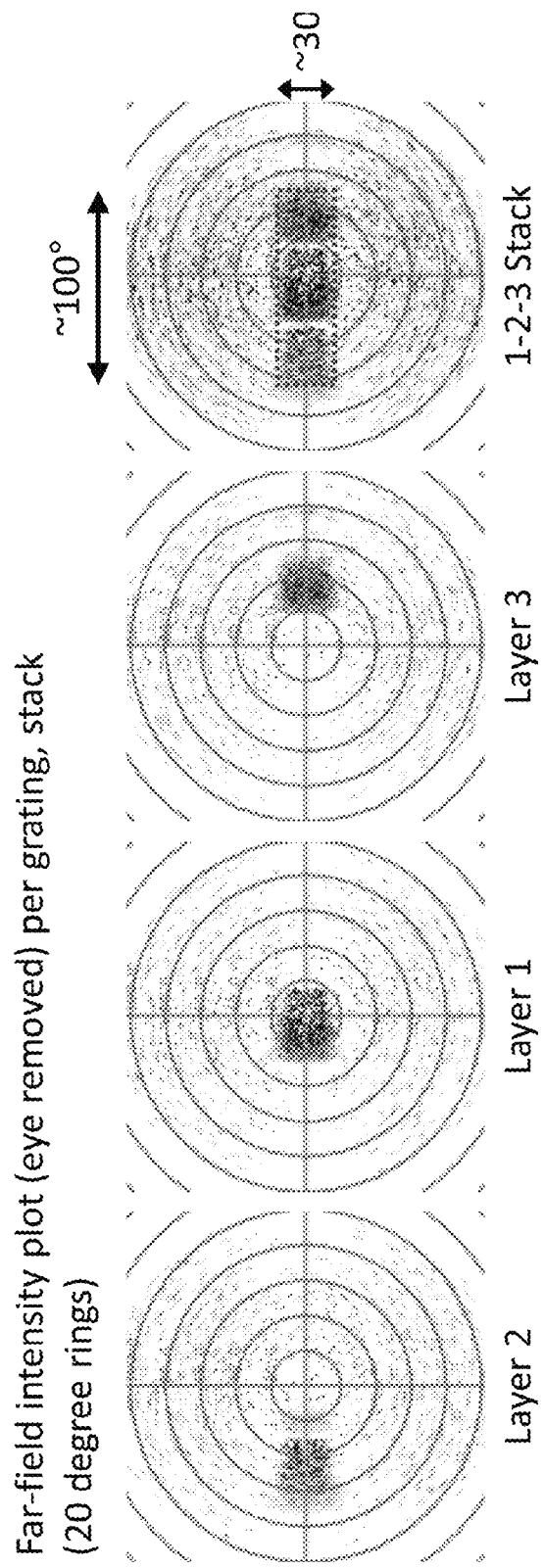
FIG. 12 (a) illustrates 3-layer image guide model for monochromatic imaging, in accordance with an embodiment.
Figure 12C:
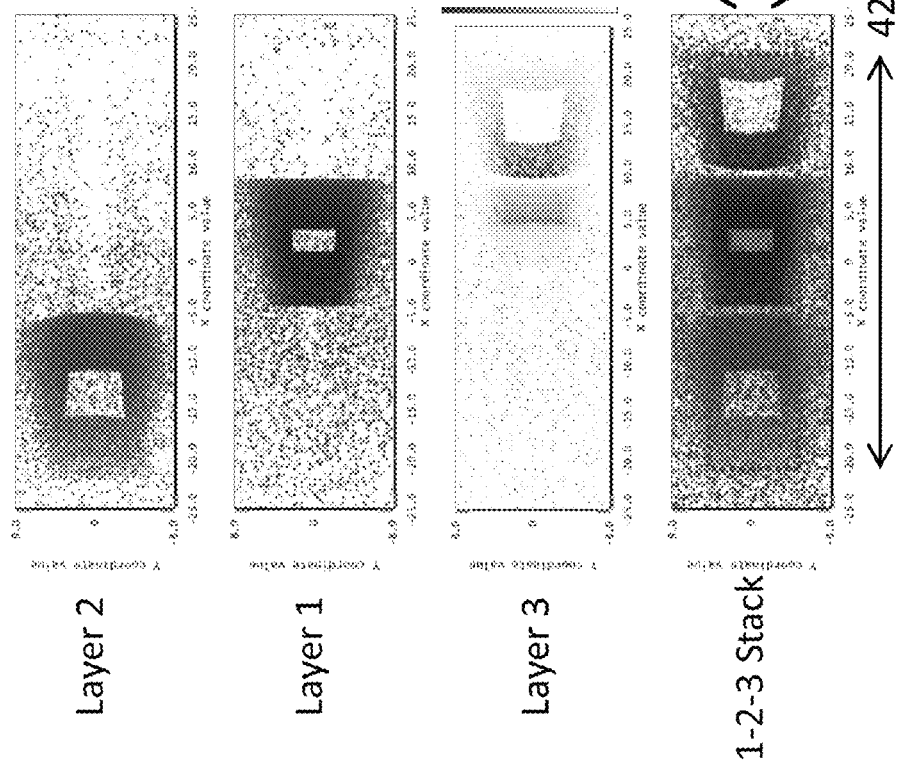

Optical Architecture of ASLM-NED:

FIG. 12(a) shows a monochromatic ray trace simulation of out-of-plane illuminated ASLM-NED that is similar to the system depicted in FIG. 8. For the purpose of demonstrating feasibility of the multi-layer approach, a single layer of the image guide is modelled while the output grating vector $K_{output}$ is altered per sub-FOV. In FIG. 12 (a), the SLM is placed at the front focal point of a collimating lens. On the surface of the opposite side of image guide, input and output coupling gratings are modeled on the surface opposite from the display and eye. Focal length of the collimating lens is selected so that a single image guide layer supports about 33° (H)×33° (V) full FOV. The eye is modelled by an f=16.7 mm ideal lens. FIG. 12 (b) shows the angular extent of rays after the output coupling grating, from each of the three layers as well as combined angular extent from all of the three layers for the micro display with all pixels are on. Each of the image guide layers supports about full FOV of 33°. By modulating grating period of output grating, a total of 103° (H)×33° (V) full FOV is supported by three layer of image guides.

In FIG. 12 (c), the irradiance on retina from each of the image guide layers as well as combination of those 3 irradiance profiles are depicted. In the simulation, a rectangular part of micro display was turned off while all other pixels are on. False color is used to represent irradiance such that darker region represents greater irradiance on the simulated retina. The 3-layer design supports wide FOV of 103° (H)×33° (V) full FOV. Image artifacts are apparent, such as distortion from the aforementioned grating vector mismatch, can be compensated optically or digitally. Also, the gap between FOV channels can be tuned by grating and bandwidth management design or by employing a multiplexed volume Bragg grating.

Figure 11B:
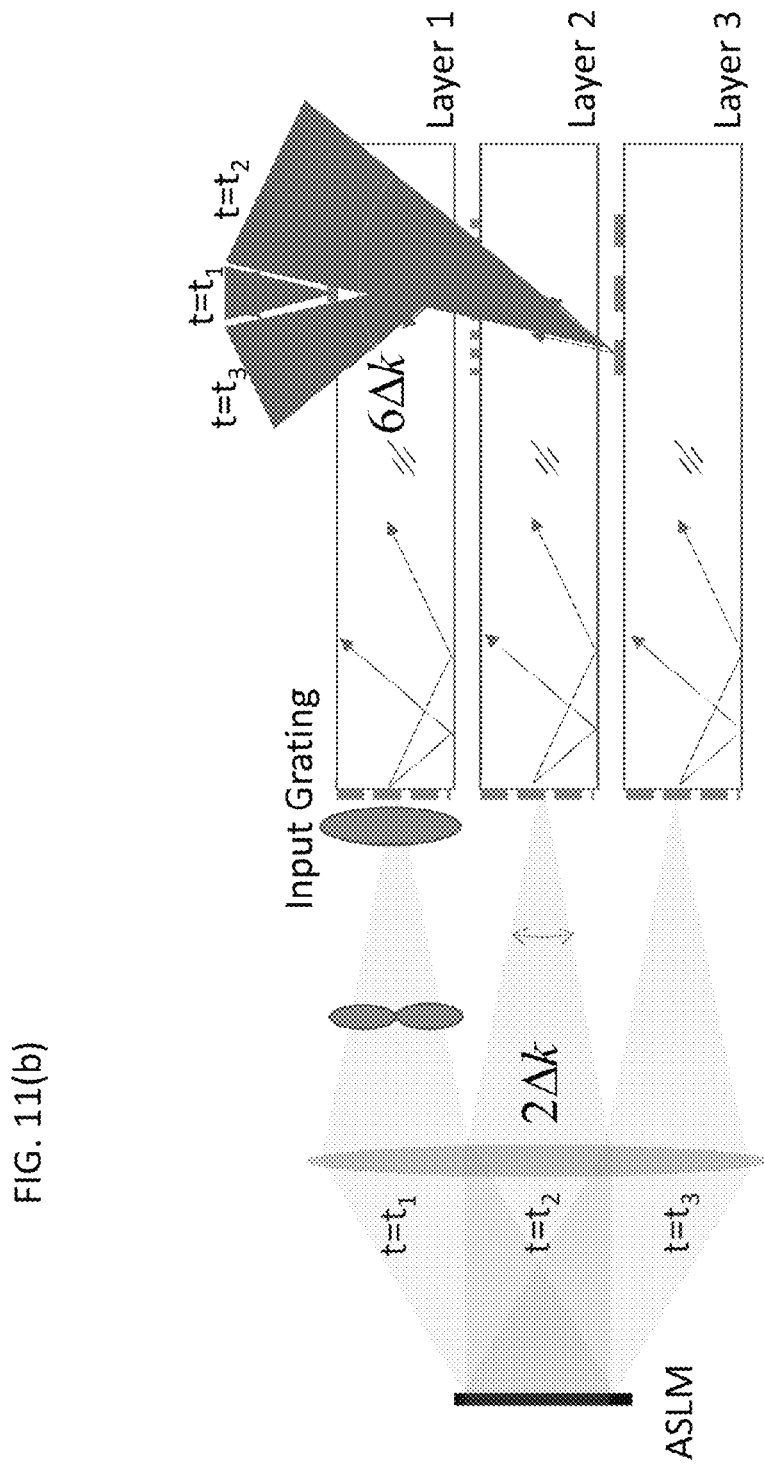
FIG. 11 illustrates an optical architecture of ASLM-NED, in (a) out-of-plane coupling, and (b) side coupling, in accordance with an embodiment.
Figure 13:
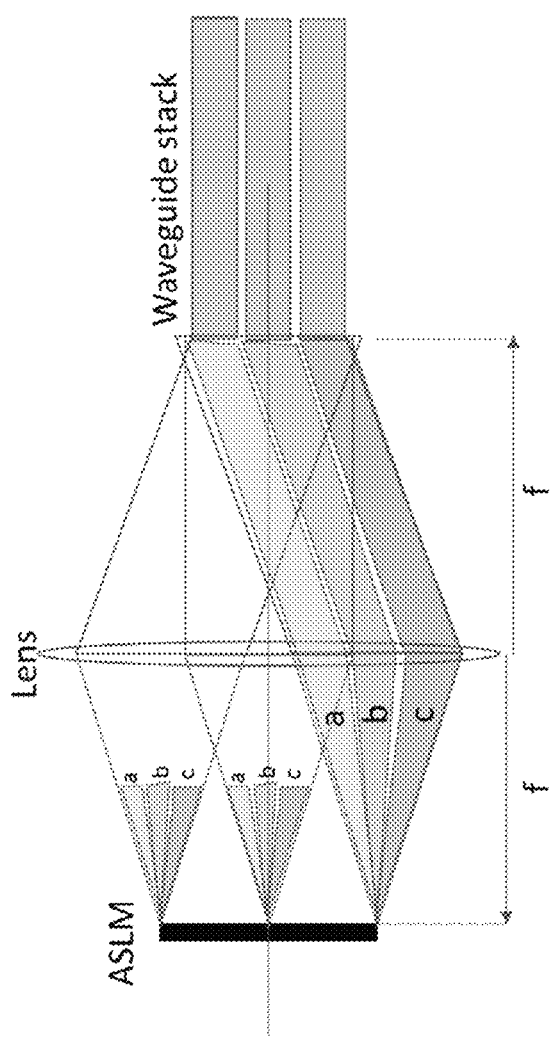
FIG. 13 illustrates ASLM coupling into waveguide stack, in accordance with an embodiment.

FIG. 13 shows a similar waveguide input coupler setup as FIG. 11(b) except with a different light path representation and only a single imaging lens. At a first time t1, all pixels on the ASLM project a pattern into direction "a". The ASLM is collimated into the waveguide stack. The entrance of the waveguide (i.e., image guides) stack is located at a pupil plane, which means the angular space is mapped across the area of the pupil and across the input facets of the waveguides. All points across the ASLM project a pattern into the top-most waveguide. At a second time t2, all pixels project a pattern into direction "b". The collimated light (spatial information transformed to angular information) is coupled into the middle waveguide. Same for t3 at angle "c" into the bottom waveguide. The result is that each waveguide propagates the same full FOV of the ASLM as defined by the ASLM height and the focal length of the lens. However, since the sub-FOVs are time-multiplexed and can be output by different gratings in different directions, the final output FOV by the waveguide can be three times expanded. The system clearly scales with more waveguides and angles.

Figure 14:
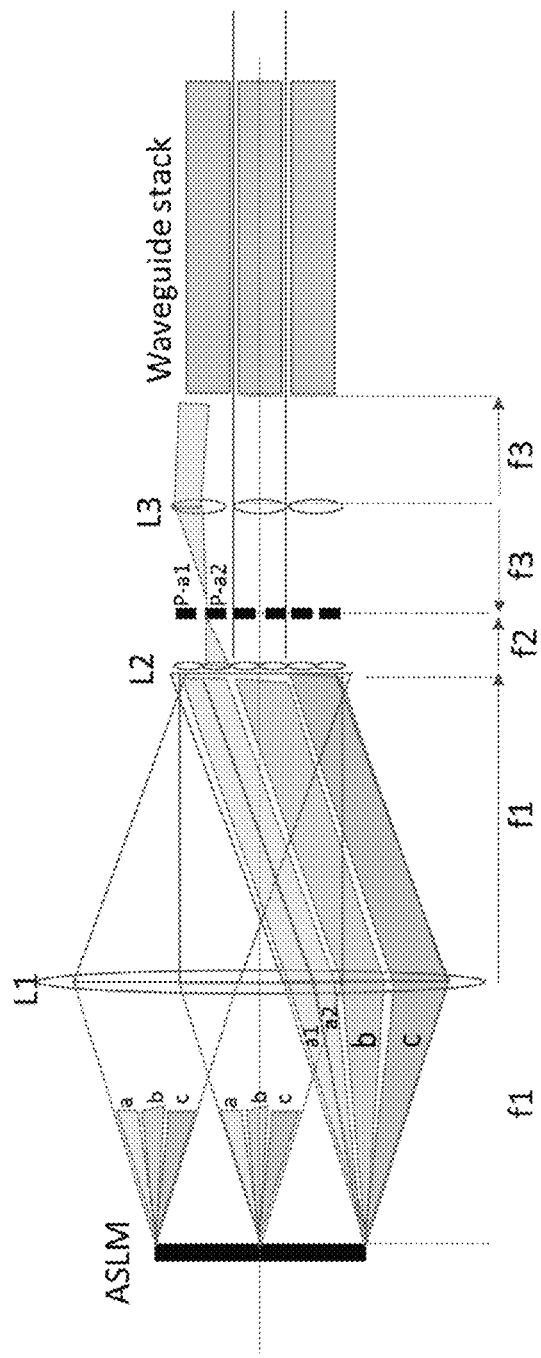
FIG. 14 illustrates ASLM coupling into waveguide stack incorporating a pixel multiplying system, in accordance with an embodiment.

The Following Outlines Another Setup:

FIG. 14 shows the same system as FIG. 13, except two additional lens arrays L2 and L3, with respective focal lengths f2 and f3, are added between the first lens L1 and the waveguide (i.e., image guide) stack. Instead of three angular directions "a", "b", "c", each of the 3 directions of FIG. 13 is split into two more directions, "a1" and "a2", etc. The lens array L2 is now located at the pupil plane after the first lens L1, so the different angular patterns are spatially separated. Each microlens only captures a single time-multiplexed pattern from the ASLM and forms a projected image. For instance, at time t1, the entire ASLM forms a pattern in direction "a1" across all points and directs the light to the top-most microlens which forms projected pattern "P-a1." A second pattern "P-a2" is formed from the ASLM at time $t_2$ into angle "a2". Patterns "P-a1" and "P-a2" are vertically configured such that they form a new pattern "P-a" with twice as many pixels. The merged pattern "P-a" is then collimated into the top-most waveguide by the top-most L3 microlens. This allows twice (or N number) as many pixels to be projected into each waveguide. The FOV of the combined pattern "P-a" can be controlled by configuring the system magnification by varying f1, f2, and f3. The system can be increased to more directions and patterns (e.g., more steering directions by ASLM will create more pixels for each L3 microlens to project into each waveguide, or a 2D array of patterns at intermediate image plane by 2D ASLM image steering would increase pixel count in the second dimension), etc. The system is generally scalable, and the intermediate image plane may not have to be a real image plane, though a real image plane is depicted, as a virtual image plane is also possible, for instance by using a negative focal length for f2 to form the virtual image plane to the left of L2.

Figure 15:
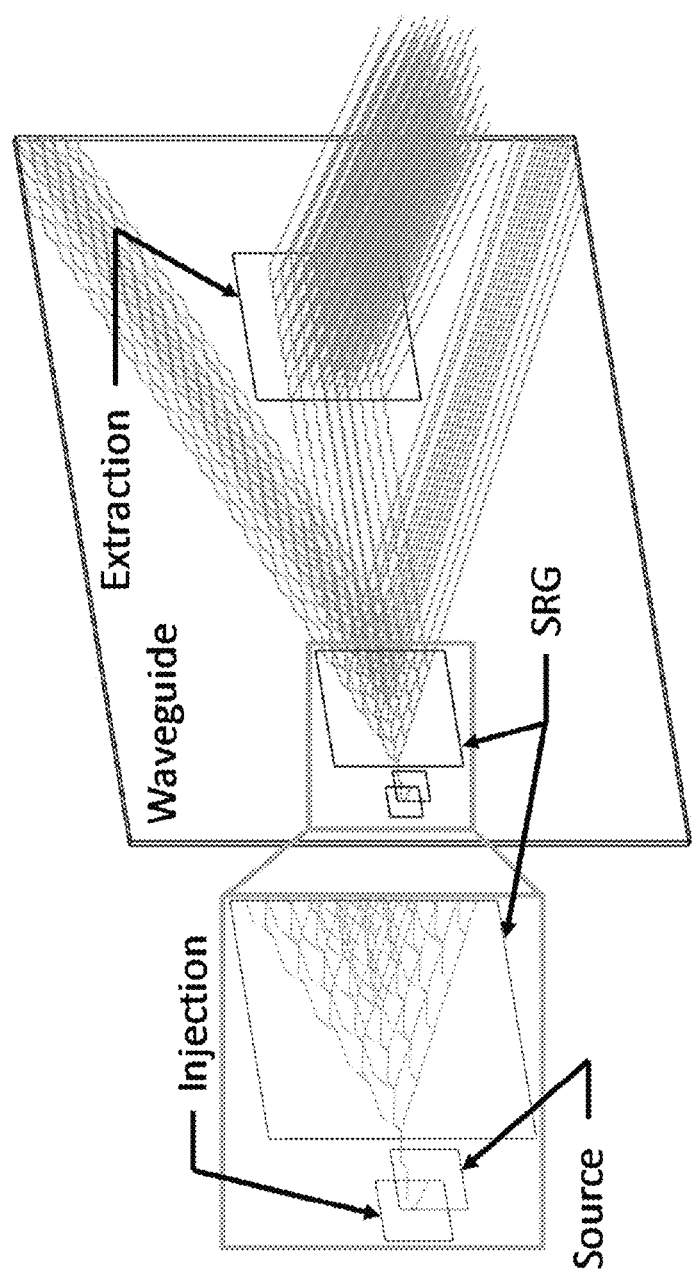
FIG. 15 illustrates a horizontally oriented Surface Relief Grating (SRG) placed between an input and an output grating in an image guide to expand a pupil in a vertical direction, in accordance with an embodiment. The in-line configuration enables a narrow image guide device.

Pupil expansion and multi accommodation So far, angular multiplexing by the ASLM is discussed primarily to support a wide FOV. For this purpose, the image FOV is distributed among multiple, spatially offset image guides stacked along the y-direction as shown in FIG. 4. The ASLM can distribute images into 2-dimensions. In the demonstration of 2-dimensional image steering (FIG. 2), diffraction by mirror array and angular offset of multiple illumination sources were used for image steering in the horizontal and vertical directions, respectively. The $2^{nd}$ spatial domain in the 2D image steering can alternatively be employed to expand the pupil and eye-box in the vertical dimension (in the x-direction in FIG. 4). The ASLM based pupil expansion can potentially be paired with in-line grating based pupil expansion techniques shown in FIG. 15 and by C. Bigler, "Holographic Optical Elements and their Applications in Waveguide Display Technologies", Ph.D. Thesis, University of Arizona, 2019, hereby incorporated herein by reference.

In the in-line geometry, a horizontally oriented Surface Relief Grating (SRG) is placed between the input and output gratings to expand the pupil in the vertical direction. The in-line configuration enables a smaller image guide device.

The 2D image steering can also enable multi-image depth projection. For example, the sub-FOV is distributed along the wider FOV dimension, and the pupil is expanded horizontally and vertically by gratings. The remaining=(DoF, image steering in y-direction, can direct time-multiplexed images to input gratings having slightly offset powers. In this manner, without resorting to an additional active device such as a liquid lens, multi-depth projection can be a part of the functionality of an ASLM-NED device.

While the ASLM commonly discussed throughout comprises a DMD by Texas Instruments, Inc., of Dallas, TX, an ASLM can also comprise other devices instead. The key aspect of an ASLM in this technology is a device which outputs multiple patterns in independent directions, either time-multiplexed or simultaneously. For instance, an ASLM can also be comprised of an OLED or LCD display device and a microlens array where each microlens forms a superpixel employing several display device pixels (i.e., subpixels) before the microlens a focal length away. Each subpixel of each superpixel corresponds to a different direction that the superpixel projects light. This is one common method to create a compact light-field display, though there is a resolution tradeoff for angular selectivity that is overcome by time-multiplexing using the DMD-based ASLM.

Dynamic Allocation of Sub Angular Bandwidth and RGB Colors into Multiple Domains:

As FIG. 12 shows, by employing subdivision of bandwidth and spatial multiplexing, a wide FOV (103° (H)×33° (V)) monochromatic image transfer is feasible. As a natural extension, if both the input and output grating vectors K and the initial angular extent and central k-vectors of sub bands are dynamically altered, a substantial reduction in the number of layers is feasible. This is also shown in FIG. 10 where an ASLM transfers the bandwidths to and from the TIR bandlimited bandwidth. The final transition labeled "ASLM" can also be a dynamic grating device or dynamic angular shifting device.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. An optical projection system, comprising:
a light source configured to emit modulated light;
a digital mirror device positioned relative to the light source such that the digital mirror device is configured to receive the modulated light emitted from the light source;
wherein the digital mirror device splits the modulated light into doubly modulated light by at least two of angular, spatial, and temporal modulation;
a catadioptric optical sub-system comprising a beam splitter configured to receive the doubly modulated light and convert the doubly modulated light into one or more plane waves.

2. The system of claim 1, wherein the light is modulated by angular modulation and spatial modulation over time at a single plane.

3. The system of claim 1, wherein the digital mirror device is an angular spatial light modulator.

4. The system of claim 1, wherein the catadioptric optical sub-system further comprises an optics cell.

5. A method for generating augmented reality displays, comprising the steps of: illuminating a modulator with modulated light by at least two of angular, spatial, and temporal modulation, resulting in doubly modulated light;
capturing the doubly modulated light at an optical system comprising a beam splitter; and
converting, via the optical system, the doubly modulated light into one or more plane waves.

6. The method of claim 5, wherein the modulator is an angular spatial light modulator.

7. The method of claim 5, wherein the modulator is illuminated via a Total Internal Reflection prism.

8. The method of claim 5, wherein the modulated light is doubly modulated in spatial and angular dimensions.

9. An optical projection system, comprising:
an angular spatial light modulator configured to modulate light in angle and space over time at a single plane to create multiple spatial patterns of light and emit the light into respective multiple directions;
a set of two or more image guides, each image guide having an input and an output;
an optical system positioned to receive the emitted light and configured to direct the emitted light of each of the multiple directions into respective image guides;
wherein the light propagates through the image guides, and each image guide output is configured to output the light at different angles.

10. The system of claim 9, wherein the emitted light of each of the multiple directions is directed into unique image guides by the optical system.

11. The system of claim 9, wherein the emitted light of a set of the multiple directions is directed into an image guide by the optical system.

12. The system of claim 9, wherein the image guides comprise a plurality of layers.

13. The system of claim 9, wherein the image guides are positioned to be spatially separated.

14. The system of claim of claim 9, where the angular spatial light modulator comprises a Digital Micromirror Device and an illumination device which illuminates the Digital Micromirror Device with light for the multiple spatial patterns.

15. The system of claim 14, where the illumination device comprises multiple illumination sources which generate the light for the multiple spatial patterns.

16. The system of claim 14, where the Digital Micromirror Device is configured to form the multiple directions and the multiple directions are formed by diffraction-based beam steering.

17. The system of claim 14, where the Digital Micromirror Device is configured to form the multiple directions and the multiple directions are formed by time and angular multiplexed illumination steering.

* * * * *